United States Patent
Sano

(10) Patent No.: US 7,272,416 B2
(45) Date of Patent: Sep. 18, 2007

(54) SITE DIVERSITY TRANSMISSION/RECEPTION APPARATUS, BASE STATION, AND MOBILE STATION

(75) Inventor: Hiroyasu Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/482,482

(22) PCT Filed: Sep. 10, 2002

(86) PCT No.: PCT/JP02/09194

§ 371 (c)(1),
(2), (4) Date: Dec. 31, 2003

(87) PCT Pub. No.: WO03/028250

PCT Pub. Date: Apr. 3, 2003

(65) Prior Publication Data

US 2004/0180695 A1    Sep. 16, 2004

(30) Foreign Application Priority Data

Sep. 25, 2001 (JP) .............................. 2001-292375

(51) Int. Cl.
*H04M 1/00* (2006.01)
*H04Q 7/20* (2006.01)

(52) U.S. Cl. ................ 455/562.1; 455/452.1

(58) Field of Classification Search ............... 455/561, 455/562.1, 442, 69, 522, 101, 67.16, 422.1, 455/434, 103, 456.1, 452.1; 375/262, 260
See application file for complete search history.

(56) References Cited

U.S. PATENT DOCUMENTS

| | | | |
|---|---|---|---|
| 5,675,581 A * | 10/1997 | Soliman ..................... 370/252 |
| 5,812,938 A * | 9/1998 | Gilhousen et al. ............ 455/69 |
| 5,839,056 A * | 11/1998 | Hakkinen ..................... 455/69 |
| 6,141,542 A * | 10/2000 | Kotzin et al. ................ 455/101 |
| 6,353,638 B1 * | 3/2002 | Hottinen et al. ............ 375/260 |
| 6,430,399 B1 * | 8/2002 | Niemela .................. 455/67.16 |
| 6,483,866 B1 * | 11/2002 | Suzuki ........................ 375/149 |
| 6,487,191 B1 * | 11/2002 | Kang et al. ................. 370/342 |
| 6,493,815 B1 * | 12/2002 | Kim et al. ................... 711/217 |
| 6,498,936 B1 * | 12/2002 | Raith .......................... 455/466 |

(Continued)

FOREIGN PATENT DOCUMENTS

| | | |
|---|---|---|
| JP | 5-110539 A | 4/1993 |
| JP | 10-247873 A | 9/1998 |
| JP | 2000-004215 A | 1/2000 |
| JP | 2000-184428 A | 6/2000 |
| JP | 2002-43981 A | 2/2002 |
| WO | WO95/35641 A1 | 12/1995 |

*Primary Examiner*—Joseph Feild
*Assistant Examiner*—Kiet Doan
(74) *Attorney, Agent, or Firm*—Birch, Stewart, Kolasch & Birch, LLP

(57) ABSTRACT

A mobile station sends reception signal quality information to a plurality of base stations. Each of the base stations determines the condition for processing a signal that is to be sent to the mobile station, processes the signal based on the condition determined, and sends the signal. The condition may be any one or more of a modulation method, an interleave length, a coding ratio, and a puncturing rule. The mobile station receives the signals, demodulates the signals to generate soft decision values corresponding to each signal, deinterleaves the soft decision values to obtain a deinterleaved result corresponding to each soft decision value, code-combines all the deinterleaved results, and subjects the combined results to error-correction decoding processing.

25 Claims, 10 Drawing Sheets

U.S. PATENT DOCUMENTS

| | | | |
|---|---|---|---|
| 6,628,945 B1* | 9/2003 | Koorapaty et al. | 455/434 |
| 6,628,954 B1* | 9/2003 | McGowan et al. | 455/461 |
| 6,714,528 B1* | 3/2004 | Moon et al. | 370/342 |
| 6,751,187 B2* | 6/2004 | Walton et al. | 370/210 |
| 6,771,705 B2* | 8/2004 | Kenney et al. | 375/267 |
| 2001/0019592 A1* | 9/2001 | Solondz | 375/267 |
| 2001/0055329 A1* | 12/2001 | Odenwalder | 375/130 |
| 2002/0027956 A1* | 3/2002 | Lee et al. | 375/262 |
| 2002/0031082 A1* | 3/2002 | Lundby et al. | 370/209 |
| 2002/0072384 A1* | 6/2002 | Chheda | 455/522 |
| 2002/0098842 A1* | 7/2002 | Antonio et al. | 455/442 |
| 2002/0198026 A1* | 12/2002 | Niemela | 455/562 |
| 2003/0112880 A1* | 6/2003 | Walton et al. | 375/260 |
| 2004/0005012 A1* | 1/2004 | Suzuki et al. | 375/262 |

* cited by examiner

$$\begin{array}{c}u\\v1\\v2\end{array}\begin{bmatrix}1 & 1\\1 & 0\\0 & 1\end{bmatrix}$$

(e) R=2/3

$$\begin{array}{c}u\\v1\\v2\end{array}\begin{bmatrix}1 & 1 & 1 & 1\\1 & 0 & 0 & 0\\0 & 0 & 1 & 0\end{bmatrix}$$

(i) R=3/4

$$\begin{array}{c}u\\v1\\v2\end{array}\begin{bmatrix}1 & 1 & 1 & 1 & 1 & 1\\1 & 0 & 0 & 0 & 0 & 0\\0 & 0 & 0 & 1 & 0 & 0\end{bmatrix}$$

(b) $\begin{bmatrix}1 & 1\\0 & 1\\1 & 0\end{bmatrix}$ (f) $\begin{bmatrix}1 & 1 & 1 & 1\\0 & 0 & 1 & 0\\1 & 0 & 0 & 0\end{bmatrix}$ (j) $\begin{bmatrix}1 & 1 & 1 & 1 & 1 & 1\\0 & 0 & 0 & 1 & 0 & 0\\1 & 0 & 0 & 0 & 0 & 0\end{bmatrix}$ (c) $\begin{bmatrix}1 & 1\\1 & 0\\1 & 0\end{bmatrix}$ (g) $\begin{bmatrix}1 & 1 & 1 & 1\\0 & 1 & 0 & 0\\0 & 0 & 0 & 1\end{bmatrix}$ (k) $\begin{bmatrix}1 & 1 & 1 & 1 & 1 & 1\\0 & 0 & 1 & 0 & 0 & 0\\0 & 0 & 0 & 0 & 0 & 1\end{bmatrix}$ (d) $\begin{bmatrix}1 & 1\\0 & 1\\0 & 1\end{bmatrix}$ (h) $\begin{bmatrix}1 & 1 & 1 & 1\\0 & 0 & 0 & 1\\0 & 1 & 0 & 0\end{bmatrix}$ (l) $\begin{bmatrix}1 & 1 & 1 & 1 & 1 & 1\\0 & 1 & 0 & 0 & 0 & 0\\0 & 0 & 0 & 0 & 1 & 0\end{bmatrix}$

$$\begin{matrix} u \\ v1 \\ v2 \end{matrix} \begin{bmatrix} 1 & 1 \\ 1 & 0 \\ 0 & 1 \end{bmatrix}$$

(d) R=2/3

$$\begin{matrix} u \\ v1 \\ v2 \end{matrix} \begin{bmatrix} 1 & 1 & 1 & 1 \\ 1 & 0 & 0 & 0 \\ 0 & 0 & 1 & 0 \end{bmatrix}$$

(h) R=3/4

$$\begin{matrix} u \\ v1 \\ v2 \end{matrix} \begin{bmatrix} 1 & 1 & 1 & 1 & 1 & 1 \\ 1 & 0 & 0 & 0 & 0 & 0 \\ 0 & 0 & 0 & 1 & 0 & 0 \end{bmatrix}$$

(b) $\begin{bmatrix} 1 & 1 \\ 0 & 1 \\ 1 & 0 \end{bmatrix}$ (e) $\begin{bmatrix} 0 & 0 & 0 & 0 \\ 0 & 1 & 1 & 1 \\ 1 & 1 & 0 & 1 \end{bmatrix}$ (i) $\begin{bmatrix} 0 & 0 & 0 & 0 & 0 & 0 \\ 0 & 1 & 1 & 1 & 1 & 0 \\ 1 & 1 & 0 & 0 & 1 & 1 \end{bmatrix}$ (c) $\begin{bmatrix} 1 & 1 \\ 1 & 0 \\ 1 & 0 \end{bmatrix}$ (f) $\begin{bmatrix} 0 & 0 & 0 & 0 \\ 1 & 1 & 1 & 0 \\ 1 & 0 & 1 & 1 \end{bmatrix}$ (j) $\begin{bmatrix} 0 & 0 & 0 & 0 & 0 & 0 \\ 0 & 0 & 1 & 1 & 1 & 1 \\ 1 & 1 & 1 & 1 & 0 & 0 \end{bmatrix}$ (g) $\begin{bmatrix} 0 & 0 & 0 & 0 \\ 1 & 1 & 0 & 1 \\ 0 & 1 & 1 & 1 \end{bmatrix}$ (k) $\begin{bmatrix} 0 & 0 & 0 & 0 & 0 & 0 \\ 0 & 1 & 1 & 0 & 1 & 1 \\ 1 & 0 & 1 & 1 & 0 & 1 \end{bmatrix}$

FIG.9

$R=1/2$ (a) QPSK TRANSMISSION $$\begin{array}{c} u \\ v1 \\ v2 \end{array} \begin{bmatrix} 1 & 1 \\ 1 & 0 \\ 0 & 1 \end{bmatrix}$$

BPSK TRANSMISSION (b) $\begin{bmatrix} 0 & 0 \\ 0 & 1 \\ 1 & 0 \end{bmatrix}$  (e) $\begin{bmatrix} 0 & 0 \\ 1 & 1 \\ 0 & 0 \end{bmatrix}$  (h) $\begin{bmatrix} 1 & 0 \\ 0 & 1 \\ 0 & 0 \end{bmatrix}$ (c) $\begin{bmatrix} 1 & 1 \\ 0 & 0 \\ 0 & 0 \end{bmatrix}$  (f) $\begin{bmatrix} 0 & 0 \\ 0 & 0 \\ 1 & 1 \end{bmatrix}$  (i) $\begin{bmatrix} 0 & 1 \\ 0 & 0 \\ 1 & 0 \end{bmatrix}$ (d) $\begin{bmatrix} 0 & 0 \\ 1 & 0 \\ 1 & 0 \end{bmatrix}$  (g) $\begin{bmatrix} 0 & 0 \\ 0 & 1 \\ 0 & 1 \end{bmatrix}$

16QAM TRANSMISSION
$\begin{array}{c} u \\ v1 \\ v2 \end{array} \begin{bmatrix} 1 & 1 & 1 & 1 & 1 & 1 \\ 1 & 0 & 0 & 0 & 0 & 0 \\ 0 & 0 & 0 & 1 & 0 & 0 \end{bmatrix}$

---

QPSK TRANSMISSION (b) $\begin{array}{c} u \\ v1 \\ v2 \end{array} \begin{bmatrix} 1 & 0 & 0 & 1 & 0 & 0 \\ 0 & 1 & 0 & 0 & 0 & 0 \\ 0 & 0 & 0 & 0 & 1 & 0 \end{bmatrix}$
(e) $\begin{bmatrix} 1 & 0 & 0 & 1 & 0 & 0 \\ 0 & 0 & 0 & 0 & 1 & 0 \\ 0 & 1 & 0 & 0 & 0 & 0 \end{bmatrix}$
(h) $\begin{bmatrix} 1 & 0 & 1 & 1 & 0 & 1 \\ 0 & 0 & 0 & 0 & 0 & 0 \\ 0 & 0 & 0 & 0 & 0 & 0 \end{bmatrix}$ (c) $\begin{bmatrix} 0 & 1 & 0 & 0 & 1 & 0 \\ 0 & 0 & 1 & 0 & 0 & 0 \\ 0 & 0 & 0 & 0 & 0 & 1 \end{bmatrix}$
(f) $\begin{bmatrix} 0 & 1 & 0 & 0 & 1 & 0 \\ 0 & 0 & 0 & 0 & 0 & 1 \\ 0 & 0 & 1 & 0 & 0 & 0 \end{bmatrix}$
(i) $\begin{bmatrix} 1 & 1 & 0 & 1 & 1 & 0 \\ 0 & 0 & 0 & 0 & 0 & 0 \\ 0 & 0 & 0 & 0 & 0 & 0 \end{bmatrix}$ (d) $\begin{bmatrix} 0 & 0 & 1 & 0 & 0 & 1 \\ 0 & 0 & 0 & 1 & 0 & 0 \\ 1 & 0 & 0 & 0 & 0 & 0 \end{bmatrix}$
(g) $\begin{bmatrix} 0 & 0 & 1 & 0 & 0 & 1 \\ 1 & 0 & 0 & 0 & 0 & 0 \\ 0 & 0 & 0 & 1 & 0 & 0 \end{bmatrix}$
(j) $\begin{bmatrix} 0 & 1 & 1 & 0 & 1 & 1 \\ 0 & 0 & 0 & 0 & 0 & 0 \\ 0 & 0 & 0 & 0 & 0 & 0 \end{bmatrix}$

FIG.11

(a)  R=3/4
$\begin{array}{c} u \\ v1 \\ v2 \end{array} \begin{bmatrix} 1 & 1 & 1 & 1 & 1 & 1 \\ 1 & 0 & 0 & 0 & 0 & 0 \\ 0 & 0 & 0 & 1 & 0 & 0 \end{bmatrix}$

16QAM TRANSMISSION

(b) $\begin{array}{c} u \\ v1 \\ v2 \end{array} \begin{bmatrix} 0 & 0 & 0 & 0 & 0 & 0 \\ 0 & 1 & 0 & 0 & 0 & 0 \\ 0 & 0 & 0 & 0 & 1 & 0 \end{bmatrix}$ (c) $\begin{bmatrix} 0 & 0 & 0 & 0 & 0 & 0 \\ 0 & 0 & 1 & 0 & 0 & 0 \\ 0 & 0 & 0 & 0 & 0 & 1 \end{bmatrix}$ (d) $\begin{bmatrix} 0 & 0 & 0 & 0 & 0 & 0 \\ 0 & 0 & 0 & 1 & 0 & 0 \\ 1 & 0 & 0 & 0 & 0 & 0 \end{bmatrix}$

BPSK TRANSMISSION

(e) $\begin{bmatrix} 0 & 0 & 0 & 0 & 0 & 0 \\ 0 & 0 & 0 & 0 & 1 & 0 \\ 0 & 1 & 0 & 0 & 0 & 0 \end{bmatrix}$ (f) $\begin{bmatrix} 0 & 0 & 0 & 0 & 0 & 0 \\ 0 & 0 & 0 & 0 & 0 & 1 \\ 0 & 0 & 1 & 0 & 0 & 0 \end{bmatrix}$ (g) $\begin{bmatrix} 0 & 0 & 0 & 0 & 0 & 0 \\ 1 & 0 & 0 & 1 & 0 & 0 \\ 0 & 0 & 0 & 0 & 0 & 0 \end{bmatrix}$ (h) $\begin{bmatrix} 0 & 1 & 0 & 0 & 1 & 0 \\ 0 & 0 & 0 & 0 & 0 & 0 \\ 0 & 0 & 0 & 0 & 0 & 0 \end{bmatrix}$ (i) $\begin{bmatrix} 0 & 0 & 1 & 0 & 0 & 1 \\ 0 & 0 & 0 & 0 & 0 & 0 \\ 0 & 0 & 0 & 0 & 0 & 0 \end{bmatrix}$ (j) $\begin{bmatrix} 1 & 0 & 0 & 1 & 0 & 0 \\ 0 & 0 & 0 & 0 & 0 & 0 \\ 0 & 0 & 0 & 0 & 0 & 0 \end{bmatrix}$ (k) $\begin{bmatrix} 0 & 1 & 0 & 0 & 1 & 0 \\ 0 & 0 & 0 & 0 & 0 & 0 \\ 0 & 0 & 0 & 0 & 0 & 0 \end{bmatrix}$ (l) $\begin{bmatrix} 0 & 0 & 1 & 0 & 0 & 1 \\ 0 & 0 & 0 & 0 & 0 & 0 \\ 0 & 0 & 0 & 0 & 0 & 0 \end{bmatrix}$

US 7,272,416 B2

SITE DIVERSITY TRANSMISSION/RECEPTION APPARATUS, BASE STATION, AND MOBILE STATION

TECHNICAL FIELD

The present invention relates to a multiple access mobile communication system such as a single-carrier code division multiple access (CDMA) mobile communication system or a multicarrier CDMA mobile communication system. More specifically, the present invention relates to a site diversity transmission/reception apparatus for site diversity communication between a mobile station and a plurality of base stations, and relates to the base station and the mobile station.

BACKGROUND ART

A characteristic of wireless communication is that a signal is received from multipaths. In other words, a signal arrives at a reception point through a plurality of transmission lines in the form of a direct wave, a reflected wave, a transmitted wave, a diffracted wave and the like. As these waves have different signal intensities, phases, and reception levels, fading occurs. In mobile communication, which is communication between the base station and the mobile station, the fading also occurs when a direct wave is shut off because of an obstacle, such as a building, or when the distance between the base station and the mobile station changes.

One approach to avoid the fading is to use the technique of site diversity in a mobile station. The site diversity technique includes receiving signals from a plurality of base stations, demodulating those signals and combining those signals. As a result, even if signal form one base station becomes weak, quality of communications with the other base stations can be maintained.

Another approach to eliminate the effect of the fading is to use CDMA, as a multiple access, separate a multipath fading wave from the signals by RAKE reception and combine the signals while making phases of the signals uniform.

The technique of the site diversity is disclosed in Japanese Patent Application Laid-Open Nos. H10-247873 and 2000-4215.

Japanese Patent Application Laid-Open No. H10-247873 discloses a technology in which base stations receive an error-correction coded signal from a mobile station, the base stations transmit the error-correction coded signals to a host apparatus, and the host apparatus carries out error-correction code coding, combining, and, error-correction code decoding of the error-correction coded signal. This technology makes it possible to improve the error rate of the received signal without increasing the amount of signal data flowing between the base stations and the host apparatus.

The Japanese Patent Application Laid-Open No. 2000-4215 discloses a technology in which an identical information data are subjected to punctured convolutional coding using mutually different puncturing patterns to obtain data punctured differently, and the data obtained is time-diversity transmitted as diversity branches. A reception unit that receives the punctured data conducts depuncturing the data by using the puncturing patterns that were used at the transmission side, combines the depunctured data, and subjects the combined data to convolution-decoding.

In the technology disclosed in the Japanese Patent Application Laid-Open No. H10-247873, all the base stations send an identical signal to the mobile station. Since the base stations send the identical signal, the quality of those signals, when they are received at the mobile station, vary greatly according to the state of a transmission line between the mobile station and each of the base stations. If the base stations are configured to performs error correction, for example, puncturing using a convolutional code or a turbo code for error correction, of the signal, the higher is the rate of puncturing, the more the signal is influenced by the state of the transmission line.

The technology disclosed in the Japanese Patent Application Laid-Open No. 2000-4215 performs same modulation irrespective of the state of the transmission line. As the number of modulation levels of the signals transmitted from the base stations is larger, the phases of these signals are close to each other so that the mobile station cannot satisfactorily demodulate the received signals. As a result, the site diversity can not be achieved sufficiently.

DISCLOSURE OF THE INVENTION

It is an object of the present invention to at least solve the problems in the conventional technology.

A site diversity transmission/reception apparatus according to one aspect of the present invention includes a plurality of base stations and at least one mobile station, and realizes site diversity communication between the base stations and the mobile station. Each of the base stations includes a transmission control unit that sets a condition for signal processing based on reception signal quality information, which indicates reception quality of a communication path between the base station and the mobile station and which is received from the mobile station, wherein the condition includes one or more selected from a group consisting of a modulation method, an interleave length, a coding ratio, and a puncturing rule; and a signal processing-transmitting unit that processes a signal to be transmitted to the mobile station based on the condition set by the transmission control unit and transmits the signal processed to the mobile station. The mobile station includes a plurality of receiving units, wherein each of the receiving unit receives the signal transmitted from the signal processing-transmitting unit of one of the plurality of the base stations; a plurality of demodulating units, wherein each of the demodulating units demodulates the signal received by a corresponding one of the receiving units to thereby generate a soft decision value; a plurality of deinterleavers, wherein each of the deinterleavers deinterleaves the soft decision value generated by a corresponding one of the demodulating units to thereby obtain a deinterleaved result; a combining unit that adaptively code-combines the deinterleaved results of all the deinterleavers to thereby obtain a combined result; and a decoding unit that subjects the combined results to error-correction decoding processing.

A base station according to another aspect of the present invention constitutes a mobile communication system together with at least one mobile station with which the base station performs site diversity communication. The base station includes a transmission control unit that sets a condition for signal processing based on reception signal quality information, which indicates reception quality of communication path between the base station and the mobile station and which is received from the mobile station, wherein the condition includes one or more selected from a group consisting of a modulation method, an interleave length, a coding ratio, and a puncturing rule; and a signal processing-transmitting unit that processes a signal to be transmitted to the mobile station based on the condition set by the transmission control unit and transmits the signal processed to the mobile station.

A mobile station according to still another aspect of the present invention constitutes a mobile communication system together with a plurality of base stations with which the mobile station performs site diversity communication. The mobile station includes a plurality of receiving units, wherein each of the receiving unit receives a signal transmitted from a different one of the base stations; a plurality of demodulating units, wherein each of the demodulating units demodulates the signal received by a corresponding one of the receiving units to thereby generate a soft decision value; a plurality of deinterleavers, wherein each of the deinterleavers deinterleaves the soft decision value generated by a corresponding one of the demodulating units to thereby obtain a deinterleaved result; a combining unit that adaptively code-combines the deinterleaved results of all the deinterleavers to thereby obtain a combined result; and a decoding unit that subjects the combined results to error-correction decoding processing.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 7 illustrates an example of puncturing rules when a plurality of base stations adopt the same modulation method;

FIG. 8 illustrates another example of puncturing rules when a plurality of base stations adopt the same modulation method;

FIG. 9 illustrates an example of puncturing rules when a plurality of base stations adopt two different modulation methods of quadrature phase shift keying (hereinafter, "QPSK") and binary phase shift keying (hereinafter, "BPSK");

FIG. 10 illustrates an example of puncturing rules when a plurality of base stations adopt two different modulation methods of 16 quadrature amplified modulation (hereinafter, "QAM") and QPSK; and FIG. 11 illustrates an example of puncturing rules when a plurality of base stations adopt two modulation methods of 16QAM and BPSK.

BEST MODE FOR CARRYING OUT THE INVENTION

Exemplary embodiments of the present invention will be explained below in more detail with reference to the accompanying drawings.

Figure 2:
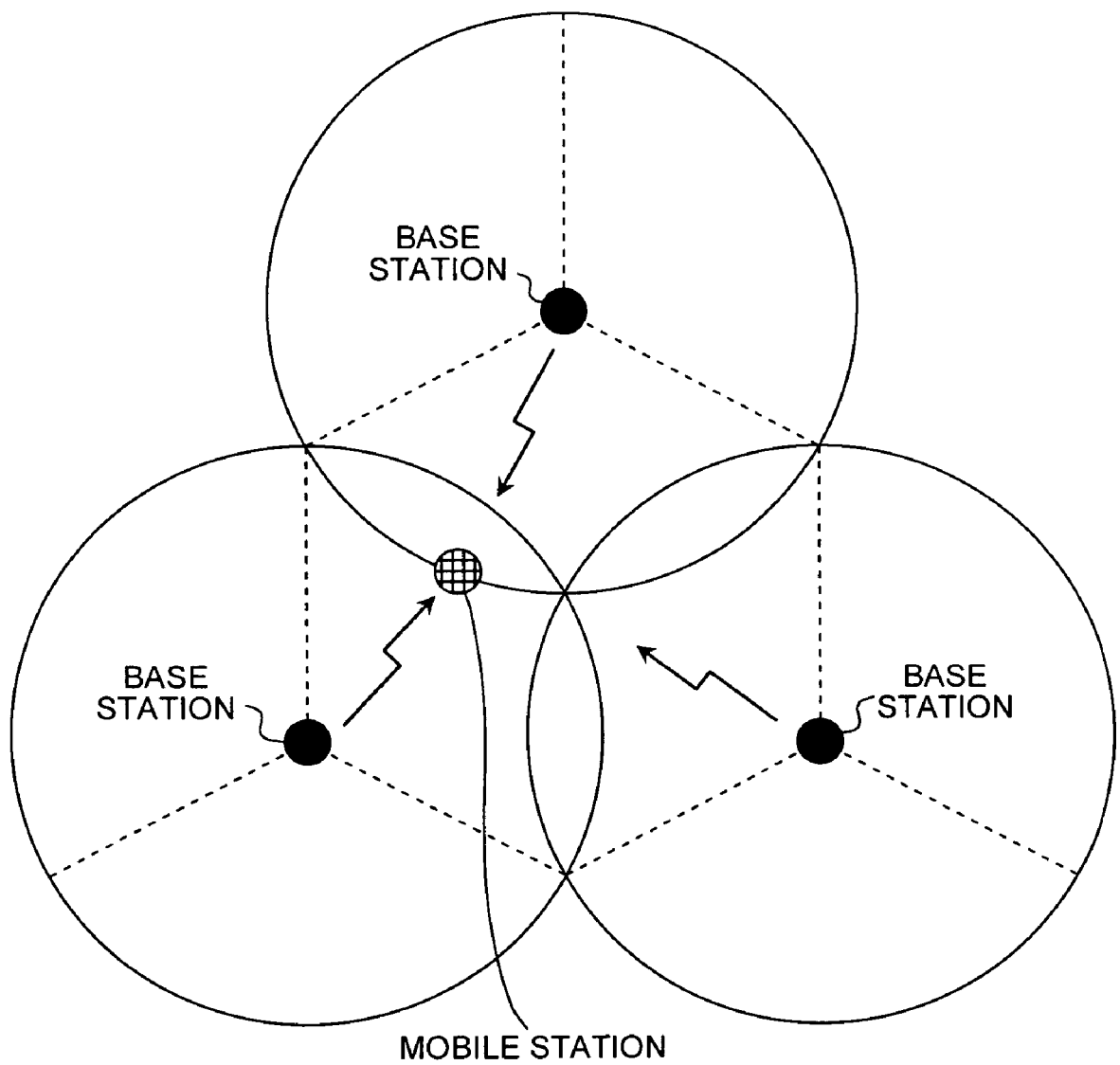
FIG. 2 illustrates a site diversity model among three base stations.

FIG. 2 is to explain the diversity among three base stations. Three base stations transmit signals to a mobile station to realize the site diversity.

Figure 1:
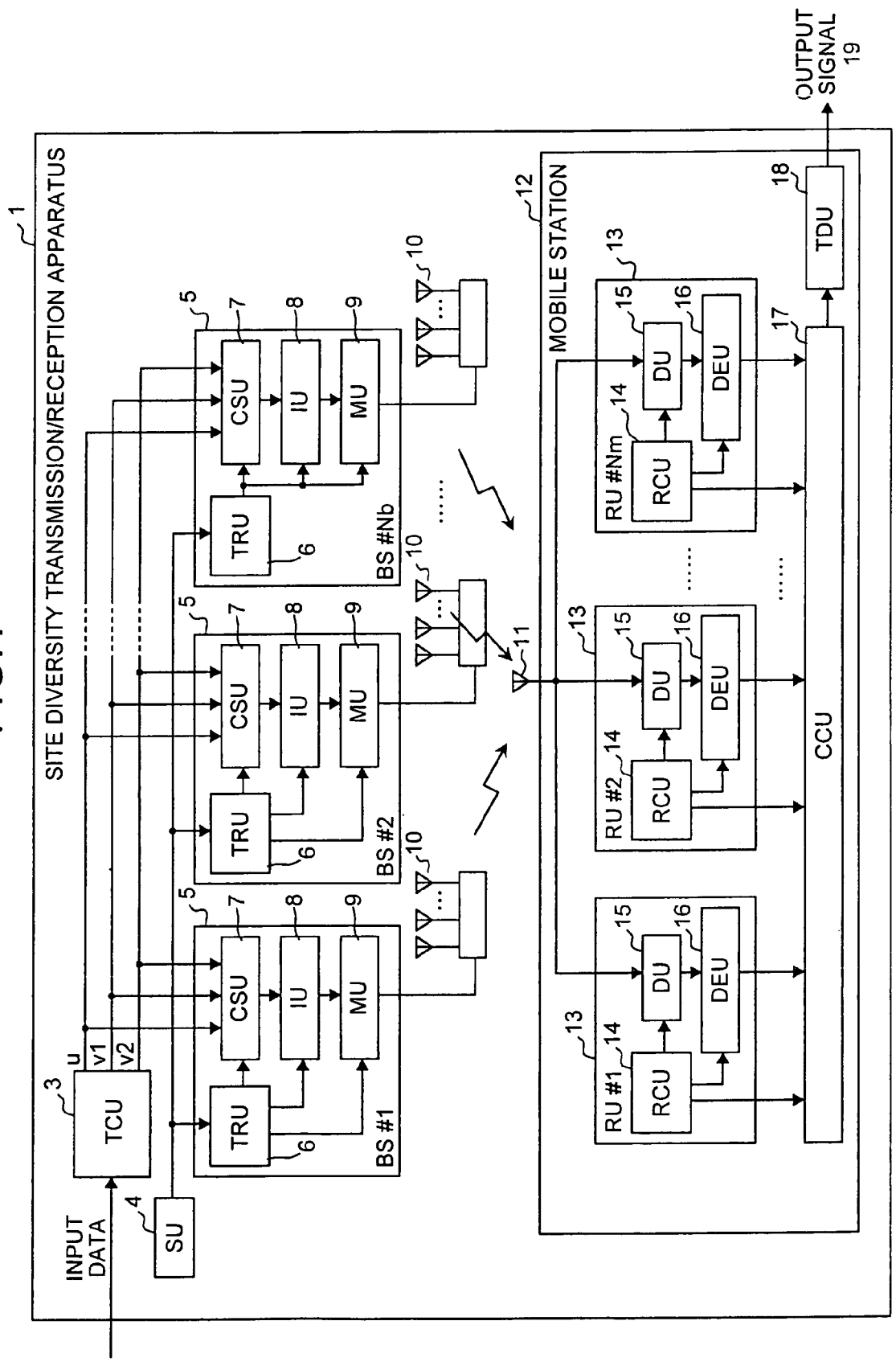
FIG. 1 is a block diagram of a site diversity transmission/reception apparatus according to an embodiment of the present invention.

FIG. 1 is a block diagram of a site diversity transmission/reception apparatus according to an embodiment of the present invention. While there are several types of error correction methods, turbo coding is employed as the error correction method in this embodiment. In addition, the transmission/reception apparatus in this embodiment adopts CDMA.

The site diversity transmission/reception apparatus 1 includes a turbo coding unit (TCU) 3, a setting unit (SU) 4, Nb base stations (BS #1 to BS #Nb) 5; and a mobile station 12.

Figure 6:
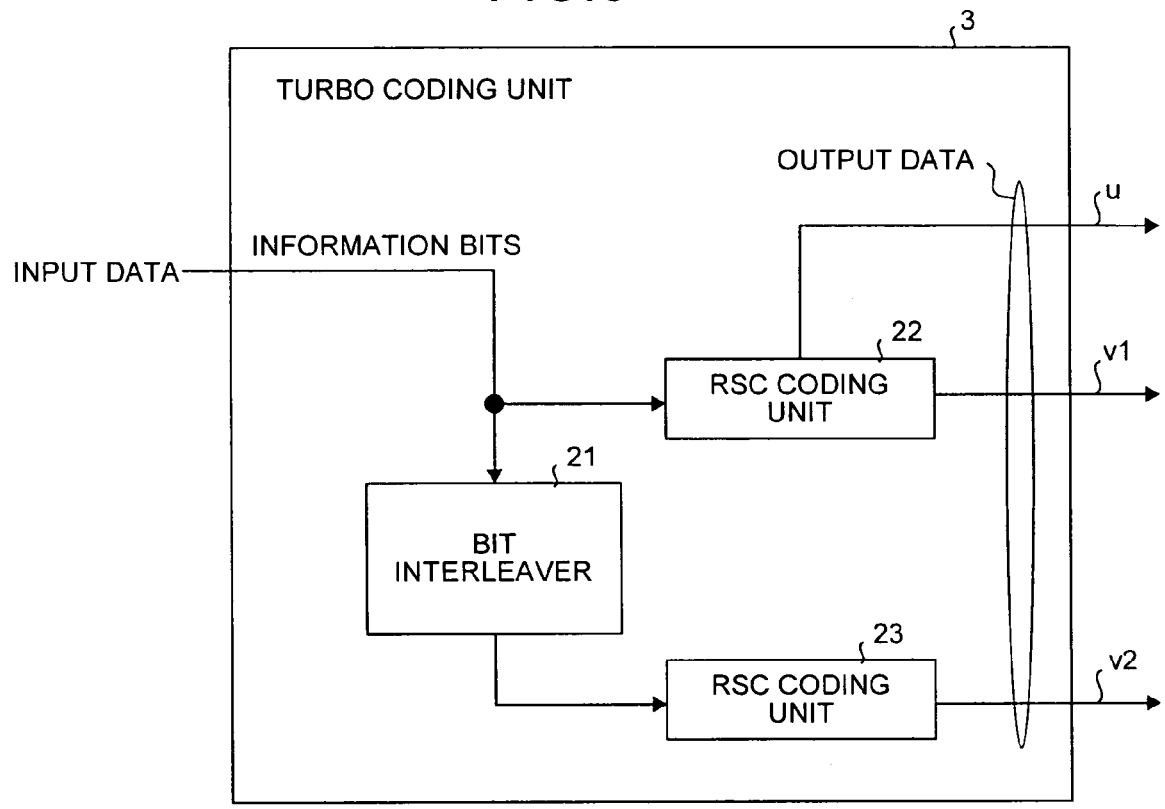
FIG. 6 is a block diagram of a turbo coding unit.

As shown in FIG. 6, the turbo coding unit 3 includes a recursive systematic convolutional (RSC) coding unit 22 that codes input data and outputs information bits u and parity bits v1 as output data, a bit interleaver 21 which interleaves the input data, and an RSC coding unit 23 that outputs parity bits v2 from the interleaved input data.

The setting unit 4 sets basic information on modulation methods, coding ratios, and error-correction puncturing rules based on reception signal quality information transmitted from the mobile station 12. This basic information is referred to when each of the base stations 5 (BS #1 to BS #Nb) determines a modulation method, a coding ratio, and an error-correction puncturing rule.

Each of the base stations 5 (BS #1 to BS #Nb) includes a transmission control unit (TRU) 6, a code selection unit (CSU) 7, an interleave unit (IU) 8, a modulation unit (MU) 9, and a base station antenna 10. In FIG. 1, the configuration required for receiving signal at the base station has been omitted for the sake of convenience.

The transmission control unit 6 of each base station 5 (BS #1 to BS #Nb) determines the modulation method, the coding ratio, and the error-correction puncturing rule of its own base station based on the comparison of the basic information input from the setting unit 4 with the individual signal quality for each base station (the reception signal quality information for each base station transmitted from the mobile station 12). The transmission control unit 6 also determines an interleave length according to the determined modulation method, coding ratio, and error-correction puncturing rule. Further, the transmission control unit 6 transmits, as control information, the determined modulation method, coding ratio, error-correction puncturing rule for its own base station to the mobile station 12 through the modulation unit 9.

The code selection unit 7 selects information bits u and parity bits v1 and v2 input from the turbo coding unit 3 using the coding ratio and the error-correction puncturing rule set by the transmission control unit 6 its own the base station.

The interleave unit 8 interleaves the data output from the code selection unit 7 using the interleave length set by the transmission control unit 6 of its own base station for each slot.

The modulation unit 9 modulates the interleaved data using the modulation method set by the transmission control unit 6 of its own base station and outputs the modulated interleaved data to the antenna 10 of the base station.

The mobile station 12 includes Nm reception units (RU #1 to RU #Nm) 13 corresponding to the base stations, a code combining unit (CCU) 17, a turbo decoding unit (TDU) 18, and a mobile station antenna 11. The configuration required for transmitting the signals from the mobile station has been omitted for the sake of convenience. Each reception unit 13 includes a reception control unit (RCU) 14, a demodulation unit (DU) 15, and a deinterleave unit (DEU) 16.

The reception control unit 14 variably sets the demodulation unit 15, the deinterleave unit 16, and the code combining unit 17 based on the modulation method, the coding ratio, and the puncturing rule transmitted from each mobile station.

A demodulation method of the demodulation unit 15 is changed according to the number of levels of the modulation method which is set, and the demodulation unit 15 executes a demodulation processing using this changed demodulation method (the demodulation method is sometimes not changed).

The deinterleave unit 16 deinterleaves the demodulated signal using the interleave length set by the reception control unit 14.

The code combining unit 17 combines soft decision values obtained after deinterleave, based on the puncturing rule set by the reception control unit 14 and using deinterleaved outputs of the plural reception units 13 (RU #1 to RU #Nm). The turbo decoding unit 18 executes a turbo decoding processing using the code-combined soft decision value and obtains an output signal 19.

Operations of the respective constituent elements of the site diversity transmission/reception apparatus 1 shown in FIG. 1 will be explained with reference to FIG. 3 to FIG. 11.

The mobile station 12 measures a signal quality (e.g., a signal-to-interference ratio (SIR) and a delay spread) of each of the signals transmitted from the respective base stations 5 (BS #1 to BS #Nb), and notifies the measure signal quality (the SIR and the delay spread) for each base station, as reception signal quality information, to each base station using an upward line.

Figure 3:
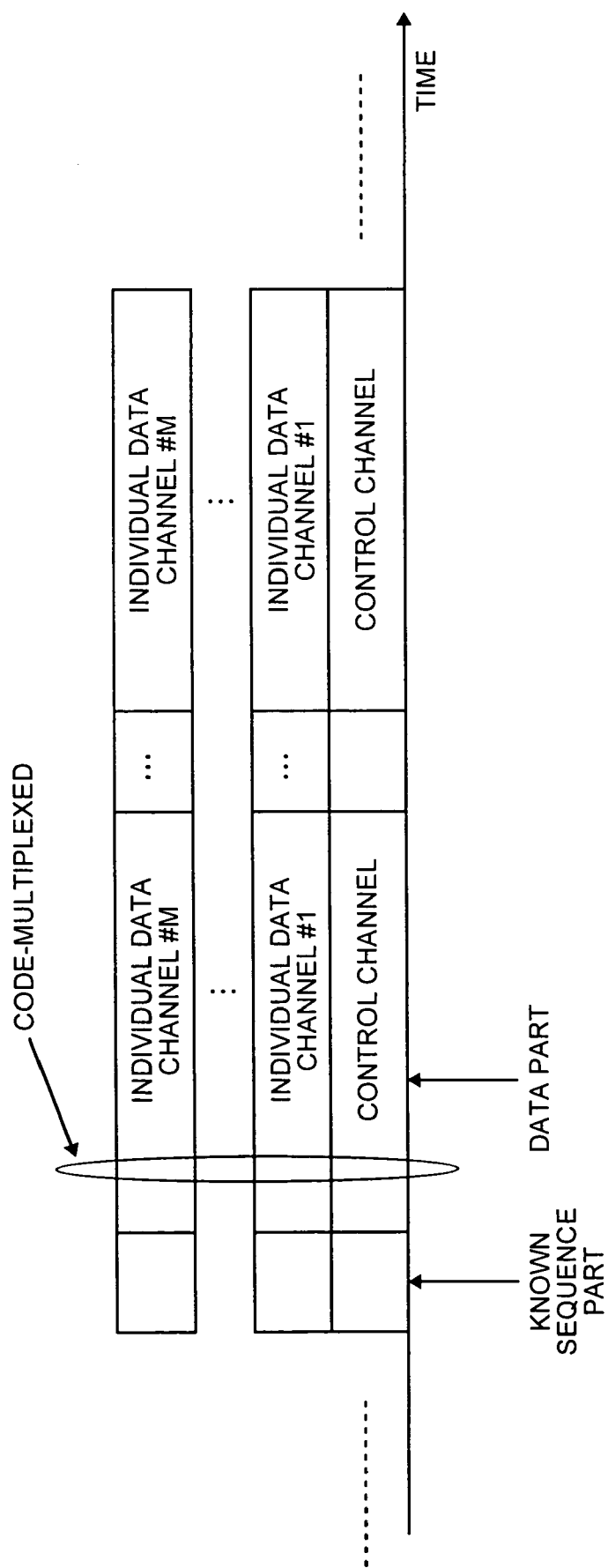
FIG. 3 illustrates data format of signals transmitted from base stations to a mobile station.

FIG. 3 illustrates a signal format of the signals transmitted from the base stations to the mobile station. In this format, control channels and individual data channels from the respective base stations are code-multiplexed. The mobile station 12 measures the SIR and the delay spread of each base station using a known sequence part in a slot of the signal transmitted from the base station. The measured SIR and delay spread represent the signal quality of each base station. As will be explained later, the control information transmitted from each base station to the mobile station 12 so as to notify the mobile station 12 of the modulation method, the coding ratio, and the puncturing rule that are variably set at each base station is transmitted over the control channel for the base station in the signal shown in FIG. 3.

Figure 4:
FIG. 4 illustrates data format of a signal transmitted from the mobile station to the base stations.

FIG. 4 illustrates a signal format of the signal transmitted from the mobile station 12 to each base station 5. The mobile station 12 inserts the measured reception signal quality information (the SIR and the delay spread) for each base station into a data part in a slot of the signal shown in FIG. 5, thereby notifying each base station of the reception signal quality information on the signal transmitted from the base station. By receiving this reception signal quality information, each base station can acquire the reception signal quality information for the base station. These pieces of reception signal quality information for the respective base stations are also input to the setting unit 4.

The setting unit 4 determines basic information on modulation methods, coding ratios, and error-correction puncturing rules, based on the received signal information quality information received from the mobile station 12 and using the SIR and the delay spread for the base station having the highest signal quality among the signal qualities for the respective base stations 5 (BS #1 to BS #Nb).

Figure 5:
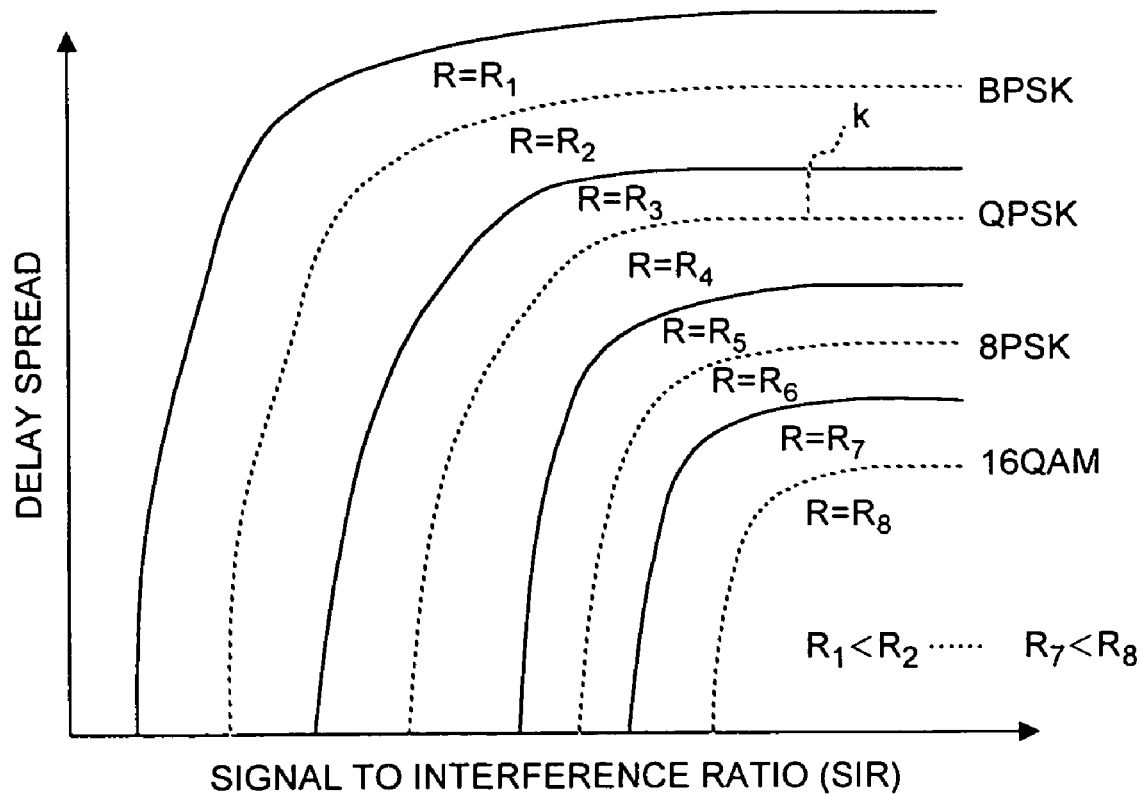
FIG. 5 illustrates the relationship among a signal quality, a modulation method to be set, and a coding ratio.

Methods for selecting basic information for the modulation methods and the coding ratios executed by the setting unit 4 will be explained with reference to FIG. 5. FIG. 5 conceptually illustrates a selection table for selecting one of the modulation methods (BPSK, QPSK, 8 phase shift keying (hereinafter, "PSK"), and 16QAM) and one of the coding ratios R in accordance with the SIR and the delay spread.

The setting unit 4 selects one modulation method from among the modulation methods BPSK, QPSK, 8PSK, and 16QAM using the SIR and the delay spread for the base station having the highest signal quality among the signal qualities measured by the mobile station 12. Boundaries of the modulation methods are indicated by solid lines. In this embodiment, as shown in FIG. 5, as the SIR is higher and the delay spread is narrower, the modulation method having more levels can be used. If the signal quality is the highest, the setting unit 4 selects the 16QAM that can provide four-bit transmission. As the delay spread is wider, the number of levels of the modulation method that satisfies a required quality decreases. If the delay spread is the widest, the setting unit 4 selects the BPSK that can provide one-bit transmission least influenced by the transmission line. Namely, the modulation method having a small number of levels is allocated to the base station having a low signal quality. In this way, the setting unit 4 selects the modulation method corresponding to the SIR and the delay spread for the base station having the highest signal quality among the signal qualities measured by the mobile station 12, and sets the selected modulation method as the basic information on modulation methods. In this embodiment, the modulation methods such as the BPSK, QPSK, 8PSK, and 16QAM which can increase the number of bits in one symbol to be transmitted are employed. Therefore, the qualities of the reception signals obtained by the site diversity can be improved without decreasing an information transmission rate.

The method for deciding the basic information on coding ratios will next be explained. In FIG. 5, symbol R represents the coding ratio and boundaries of the respective coding ratios ($R_1 < R_2 < \ldots < R_7 < R_8$) are indicated by solid lines and broken lines. That is, the boundaries defined by the solid lines and the dotted lines have different coding ratios R. In FIG. 5, as the SIR is lower and the delay spread is wider, the state of the transmission line is worse. Therefore, the coding ratio is set lower as the state of the transmission line is worse. In the QPSK modulation, for example, the coding ratios $R_3$ and $R_4$ are employed. If the state of the transmission line is worse than the state indicated by a boundary k, the setting unit 4 selects the coding ratio $R_3$. If the state of the transmission line is better than the state indicated by the boundary k, the setting unit 4 selects the coding ratio $R_4$. In this manner, the setting unit 4 selects the coding ratio R corresponding to the SIR and the delay spread for the base station having the highest signal quality from among the signal qualities measured by the mobile station 12, and sets the selected coding ratio as basic information on coding ratios.

A method for deciding basic information on puncturing rules executed by the setting unit 4 will next be explained with reference to FIG. 7 to FIG. 11. FIG. 7 and FIG. 8 illustrate puncturing rules set to the base station having the highest signal quality and to the other one or more base stations which can obtain almost the same signal quality as that of this base station. In the puncturing rules, a part indicated by "0" is not handled as transmitted data (the part is punctured) and a part indicated by "1" is handled as the transmitted data (the part is not punctured).

FIG. 7 illustrates puncturing rules for setting that all the base stations hold communication while puncturing only the parity bits v1 and v2 with the information bits u left unchanged (not punctured).

FIG. 8 illustrates the puncturing rules for setting that only one base station (one of the base stations having the highest signal quality) transmits the information bits u and that the information bits are discarded and punctured at the other base stations. The puncturing rules shown in FIG. 7 and FIG. 8 are each set so as to have the same transmission rate as that under the reference puncturing rule (a).

If the puncturing rules shown in FIG. 7 are adopted and the coding ratio R of the base station having the highest signal quality is 1/2, the setting unit 4 sets one of puncturing rules (a) to (d) that correspond to the coding ratio R=1/2 as the basic information on puncturing rules. The puncturing rules other than the selected puncturing rule are selected by the other one or more base stations. This selection is made by the transmission control unit 6 of each base station. Likewise, if the puncturing rules shown in FIG. 7 are adopted and the coding ratio R of the base station having the highest signal quality is 2/3, the setting unit 4 sets one of puncturing rules (e) to (h) that correspond to the coding ratio R=2/3 as the basic information on puncturing rules. Further, if the puncturing rules shown in FIG. 7 are adopted and the coding ratio R of the base station having the highest signal quality is 3/4, the setting unit 4 sets one of puncturing rules (i) to (l) that correspond to the coding ratio R=3/4 as the basic information on puncturing rules.

If the puncturing rules shown in FIG. 8 are adopted and the coding ratio R of the base station having the highest signal quality is 1/2, the setting unit 4 sets the puncturing rule (a) that corresponds to the coding ratio R=1/2 as the basic information on puncturing rules. The puncturing rules (b) or (c) other than the selected puncturing rule is selected at the other one or more base stations. This selection is made by the transmission control unit 6 of each base station. Likewise, if the puncturing rules shown in FIG. 8 are adopted and the coding ratio R of the base station having the highest signal quality is 2/3, the setting unit 4 sets the puncturing rule (e) that corresponds to the coding ratio R=2/3 as the basic information on puncturing rules. If the coding ratio R of the base station having the highest signal quality is 3/4, the setting unit 4 sets the puncturing rule (h) that corresponds to the coding ratio R=3/4 as the basic information on puncturing rules.

FIG. 9 to FIG. 11 illustrate various examples of modulation methods and puncturing rules set at the base station having the highest signal quality and at the other one or more base stations that can obtain only lower signal qualities than that of this base station.

FIG. 9 illustrates an example in which the setting unit 4 determines the QPSK as the modulation method at, 1/2 as the coding ratio R, and (a) as the puncturing rule as the basic information. In this example, the other one or more base stations select the BPSK modulation method and one of (b) to (i) as the puncturing rule. This selection is made by the transmission control unit 6 of each base station.

FIG. 10 illustrates an example in which the setting unit 4 determines the 16QAM as the modulation method, 3/4 as the coding ratio R, and (a) as the puncturing rule as the basic information. In this example, the other one or more base stations select the QPSK modulation method and one of (b) to (j) as the puncturing rule. This selection is made by the transmission control unit 6 of each base station.

FIG. 11 illustrates an example in which the setting unit 4 determines the 16QAM as the modulation method, 3/4 as the coding ratio R, and (a) as the puncturing rule as the basic information. In this example, the other one or more base stations select the BPSK modulation method and one of (b) to (j) as the puncturing rule. This selection is made by the transmission control unit 6 of each base station.

As shown in FIG. 9 to FIG. 11, if the setting unit 4 sets, as the basic information, the modulation method having fewer levels than those of the other base stations, the transmission signal is transmitted without decreasing the transmission rate by increasing the number of bits to be punctured. In FIG. 9, for example, the base station having the highest signal quality and the other one or more base stations which can obtain only the signal qualities lower than that of this base station differ in modulation method, i.e., the former base station selects the QPSK (the number of levels is four) whereas the latter one or more base stations select the BPSK (the number of levels is two). If the BPSK modulation method is adopted, the number of bits to be punctured is doubled from that for the QPSK, i.e., to four from two. By doing so, the signals are transmitted without decreasing the transmission rate.

As can be seen, the setting unit 4 determines the basic information on modulation methods, coding ratios, and puncturing rules based on the reception signal quality information on the base station having the highest signal quality. The setting unit 4 feeds the determined basic information to the transmission control unit 6 of each base station.

The transmission control unit 6 of each of the base stations 5 (BS #1 to BS #Nb) compares the basic information on the modulation methods, the coding ratios, and the puncturing rules input from the setting unit 4 with the individual signal quality for each base station (the reception signal quality information for each base station transmitted from the mobile station 12), and determines the modulation method, the coding ratio, and the error-correction puncturing rules for its own base station based on the comparison. In addition, the transmission control unit 6 determines the interleave length according to the modulation method, the coding ratio, and the error-correction puncturing rule. The transmission control unit 6 transmits the determined modulation method, coding ratio, and error-correction puncturing rule for its own base station, as the control information, to the mobile station 12 through the modulation unit 9.

As for the modulation method, the base station which can obtain substantially the same signal quality as that of the base station having the highest signal quality selects the same modulation method as that of the base station having the highest signal quality. The base station having a lower signal quality than that of the base station having the highest signal quality selects the modulation method having fewer levels, thereby suppressing deterioration of an output of the demodulation unit of the mobile station.

As for the coding ratio, each base station selects the same coding ratio according to the coding ratio of the base station having the highest signal quality. That is, each base station selects the same coding ratio as that input from the setting unit 4.

As for the puncturing rule, the base station which can obtain substantially the same signal quality as that of the base station having the highest signal quality sets the puncturing rule using the puncturing rules shown in, for example, FIG. 7 and FIG. 8.

For example, if the puncturing rules shown in FIG. 7 are adopted, the coding ratio R in the basic information is 1/2, and the setting unit 4 sets the puncturing rule at (a) as that for the base station having the highest signal quality, then the other one or more base stations which can obtain substantially the same signal quality as that of the base station having the highest signal quality select one of the puncturing rules (b) to (d) shown in FIG. 7. This selection is made such that if one base station selects the puncturing rule (b) shown in FIG. 7, the other base stations select the puncturing rule (c) or (d). The transmission control unit 6 of each base station 5 selects the puncturing rule for its own base station so as to be able to transmit all the bits as much as possible after collecting a puncturing result of each base station 5. The same thing is true for an example in which the puncturing rules shown in FIG. 8 are adopted. Each base station selects the puncturing rule so as to be able to transmit as many different bits as possible for the parity bits v1 and v2.

On the other hand, the base station having the highest signal quality and the other one or more base stations which can obtain only the lower signal quality than that of this base station having the highest signal quality set the puncturing rules using the puncturing rules shown in, for example FIG. 9 to FIG. 11.

For example, if the coding ratio R in the basic information is 1/2 and the setting unit 4 sets the puncturing rule at (a) shown in FIG. 9 as that for the base station having the highest signal quality, then the other one or more base stations which can obtain only the signal quality lower than that of the base station having the highest signal quality select one of the puncturing rules (b) to (i) shown in FIG. 9. Similarly to the above, this selection is made such that if one base station selects the puncturing rule (b) shown in FIG. 9, the other base stations select one of the puncturing rules (c) to (i). The transmission control unit 6 of each base station 5 selects the puncturing rule so as to be able to transmit all the bits as much as possible after collecting a puncturing result of each base station 5. The same thing is true for an example in which the puncturing rules shown in FIG. 10 or 11 are adopted. If the base stations adopt different modulation methods as shown in FIG. 9 to FIG. 11, the base station which sets the modulation method having fewer levels than those of the modulation methods for the other base stations transmits the signal without decreasing the transmission rate by increasing the number of bits to be punctured.

The transmission control unit 6 of each of the base stations 5 (BS #1 to BS #Nb) sets the coding ratio and the error-correction puncturing rule thus determined to the code selection unit 7 of its own base station. In addition, the transmission control unit 6 sets the modulation method thus determined to the modulation unit 9 of its own base station. Further, the transmission control unit 6 determines the interleave length according to the modulation method, coding ratio, and error-correction puncturing rule selected by its own base station, and sets this determined interleave length to the interleave unit 8. The transmission control unit 6 further transmits the determined modulation method, coding ratio, and error-correction puncturing rule for its own base station, as the control information, to the mobile station 12 through the modulation unit 9.

The code selection unit 7 of each of the base stations 5 (BS #1 to BS #Nb) punctures data using the coding ratio and the puncturing rule set by the transmission control unit 6 of its own base station. The code selection unit 7 handles not the part indicated by "0" in the puncturing rule as transmitted data but the part indicated by "1" as the transmitted data, and outputs the part "1" to the interleave unit 8 as the transmitted data.

The interleave unit 8 of each of the base stations 5 (BS #1 to BS #Nb) interleaves the punctured data output from the code selection unit 7 of its own base station for each slot. The interleave length has been set by the transmission control unit 6. An output interleaved by the interleave unit 8 is output to the modulation unit 9.

The modulation unit 9 of each of the base stations 5 (BS #1 to BS #Nb) modulates the interleaved data using the modulation method set by the transmission control unit 6. The modulated data includes the control information which includes the modulation method, the coding ratio, and the error-correction puncturing rule set at each base station. An output of the modulation unit 9 of each of the base stations 5 (BS #1 to BS #Nb) is output to the base station antenna 10 and transmitted to the mobile station 12.

Through these operations, the transmission signal having the control information on each base station carried over the control channel is transmitted to the mobile station 12. In CDMA, for example, the control information includes various pieces of information necessary for the mobile station 1 to demodulate the signal transmitted from each base station 5 such as the modulation method, the coding ratio, the puncturing rule, and the spreading ratio.

The mobile station 12 outputs the signals received through the mobile antenna 11 to the Nm reception unit 13 provided to correspond to the respective base stations. The reception control unit 14 of each reception unit 13 extracts the control information, corresponding to the base station for which the reception unit 13 is responsible, from the received signal, and outputs the modulation method, the coding ratio, and the puncturing rule included in the extracted control information to the demodulation unit 15 and the code combining unit 17. In addition, the reception control unit 14 acquires information necessary for the deinterleave unit 16 to carry out deinterleave such as the interleave length, using the modulation method, the coding ratio, and the puncturing rule in the control information, and outputs the acquired information to the deinterleave unit 16.

The demodulation unit 15 of each reception unit 13 variably sets a demodulation method according to the number of levels of the modulation method that is set by the reception control unit 14 of the reception unit 13, and outputs demodulated data using this set demodulation method. The demodulated data is output to the deinterleave unit 16.

The deinterleave unit 16 deinterleaves the demodulated data so that the data has the same interleave length and the same interleave structure as those for the interleave unit 8 of the corresponding base station, based on the setting of the reception control unit 14 of its own reception unit 13. The deinterleaved data is output to the code combining unit 17.

All of deinterleaved outputs of the reception units 13 are input to the code combining unit 17. The code combining unit 17 combines soft decision values obtained after the deinterleave according to the puncturing rule and the coding ratio set by each reception control unit 14. The soft decision value that is code-combined by the code combining unit 17 is input to the turbo decoding unit 18. The turbo decoding unit 18 executes a turbo decoding processing and obtains the output signal 19 as a decoding result.

As can be seen, in this embodiment, the base stations 5 select their own modulation methods, coding ratios, and puncturing rules based on the reception signal quality information transmitted from the mobile station 12, and transmit the control information including the selected modulation methods, coding ratios, and puncturing rules to the mobile station 12, respectively. The mobile station 12 selects the demodulation and the soft decision value combining processing respectively executed by the reception unit 13 and the code combining unit 17 corresponding to each base station 5, based on the received control information. Therefore, base station transmission and mobile station reception in light of the influence of the transmission line between each base station 5 and the mobile station 12 can be realized.

When deciding the modulation methods and the error-correction puncturing rules, the modulation method, the coding ratio, and the error-correction puncturing rule for each base station are selected based on those for the base station which can obtain the highest information transmission rate (to which station the modulation method having many levels is set). Therefore, the qualities of the received signals obtained by site diversity can be improved without decreasing the information transmission rate.

The mobile station adaptively combines the signals transmitted from the base stations based on the modulation methods, the coding ratios, and the error-correction puncturing rules transmitted from the respective base stations. Therefore, the decoding result can be improved and a good improvement effect can be obtained by the site diversity.

Furthermore, each base station can select the coding ratio. Accordingly, the transmission rate can be finely set according to the state of the transmission line, making it possible to enhance frequency utilization efficiency.

Since CDMA scheme is employed, the spreading ratio may be variably set for each base station and the control signal including this spreading ratio may be transmitted to the mobile station 12. Further, either the SIR or the delay spread may be used as the reception signal quality information.

As explained so far, according to the present invention, the base stations can perform transmission to the mobile station and the mobile station can perform reception from the base stations that takes into account the state of the transmission line between the base stations and the mobile station. In other words, even if the transmission line is in a bad state, better site diversity can be attained.

Moreover, the quality of the reception signal can be improved.

Furthermore, for each base station the modulation method, the interleave length, the coding ratio, and the error-correction puncturing rule can be determined according to the signal-to-interference ratio or the delay spread.

Moreover, the base station having a low signal quality is made to employ the modulation method having a small number of levels so that a deterioration of signal in the mobile station can be suppressed.

Furthermore, the quality of the reception signal is improved without decreasing the information transmission rate.

Moreover, the signal can be transmitted without decreasing the transmission rate.

Furthermore, better site diversity can be achieved.

Moreover, the signal can be transmitted based on the modulation method, the interleave length, the coding ratio, and the error-correction puncturing rule according to the state of the transmission line.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

The site diversity transmission/reception apparatus, the base station, and the mobile station according to the present invention are effectively used in the multiple access mobile communication system such as the single-carrier CDMA mobile communication system or the multicarrier CDMA mobile communication system. They are particularly suitable for a base station and a mobile station that operate in a communication environment which tends to be influenced by fading.

The invention claimed is:

1. A site diversity transmission/reception apparatus that includes a plurality of base stations and at least one mobile station, and realizes site diversity communication between the base stations and the mobile station, wherein each of the base stations includes a transmission control unit that sets a condition for signal processing based on reception signal quality information, which indicates reception quality of a communication path between the base station and the mobile station and which is received from the mobile station, wherein the condition includes one or more selected from a group consisting of a modulation method, an interleave length, a coding ratio, and a puncturing rule; and a signal processing-transmitting unit that processes a signal to be transmitted to the mobile station based on the condition set by the transmission control unit and transmits the signal processed to the mobile station, and the mobile station includes a plurality of receiving units, wherein each of the receiving unit receives the signal transmitted from the signal processing-transmitting unit of one of the plurality of the base stations;

a plurality of demodulating units, wherein each of the demodulating units demodulates the signal received by a corresponding one of the receiving units to thereby generate a soft decision value;

a plurality of deinterleavers, wherein each of the deinterleavers deinterleaves the soft decision value generated by a corresponding one of the demodulating units to thereby obtain a deinterleaved result;

a combining unit that adaptively code-combines the deinterleaved results of all the deinterleavers to thereby obtain a combined result; and a decoding unit that subjects the combined results to error-correction decoding processing.

2. The site diversity transmission/reception apparatus according to claim 1, wherein each of the transmission control unit of each of the base stations appends a control information to the signal that is transmitted by the signal processing-transmitting unit, wherein the control information is information about the condition, and each of the demodulating units of the mobile station demodulates the signal received by the corresponding one of the receiving units based on the control information included in the signal.

3. The site diversity transmission/reception apparatus according to claim 1, wherein the reception signal quality information transmitted from the mobile station to the base stations includes one of a signal-to-interference ratio and a delay spread.

4. The site diversity transmission/reception apparatus according to claim 1, wherein each of the base stations determines the reception quality of the communication path between the base station and the mobile station from the reception signal quality information, and the transmission control unit of each of the base stations sets a modulation method, as the condition, with number of levels that are appropriate to the reception quality determined.

5. The site diversity transmission/reception apparatus according to claim 4, wherein
the transmission control unit of each of the base stations sets a multi-level modulation method, as the condition, that enables an increase in the number of bits in one symbol to be transmitted.

6. The site diversity transmission/reception apparatus according to claim 4, wherein each of the base stations determines the number of levels of the modulation method set in other base stations, and
the transmission control unit, of a base station that has determined that the modulation method set in other base stations has higher levels, increases number of bits to be punctured.

7. The site diversity transmission/reception apparatus according to claim 1, wherein when the condition includes the puncturing rule and when a turbo code is applied to the puncturing rule, the signal processing-transmitting unit transmits information bits as they are and punctures parity bits.

8. The site diversity transmission/reception apparatus according to claim 1, wherein when the condition includes the puncturing rule and when a turbo code is applied to the puncturing rule, the signal processing-transmitting units of the base stations other than one base station delete information bits and puncture parity bits.

9. A base station that constitutes a mobile communication system together with at least one mobile station with which the base station performs site diversity communication, comprising:
a transmission control unit that sets a condition for signal processing based on reception signal quality information, which indicates reception quality of communication path between the base station and the mobile station and which is received from the mobile station, wherein the condition includes one or more selected from a group consisting of a modulation method, an interleave length, a coding ratio, and a puncturing rule; and
a signal processing-transmitting unit that processes a signal to be transmitted to the mobile station based on the condition set by the transmission control unit and transmits the signal processed to the mobile station;
wherein the base station determines the reception quality of the communication path between the base station and the mobile station from the reception signal quality information, and
the transmission control unit sets a modulation method, as the condition, with number of levels that are appropriate to the reception quality determined; and
wherein the base station further determines the number of levels of the modulation method set in other base stations, and the transmission control unit, if it is determined that the modulation method set in other base stations has higher levels, increases number of bits to be punctured.

10. The base station according to claim 9, wherein
the transmission control unit appends a control information to the signal that is transmitted by the signal processing-transmitting unit, wherein the control information is information about the condition set by the transmission control unit.

11. The base station according to claim 9, wherein
the transmission control unit sets a multi-level modulation method, as the condition, that enables an increase in the number of bits in one symbol to be transmitted.

12. The base station according to claim 9, wherein
when the condition includes the puncturing rule and when a turbo code is applied to the puncturing rule, the signal processing-transmitting unit transmits information bits as they are and punctures parity bits.

13. The base station according to claim 9, wherein
when the condition includes the puncturing rule and when a turbo code is applied to the puncturing rule, the signal processing-transmitting units of the base stations other than one base station delete information bits and puncture parity bits.

14. A mobile station that constitutes a mobile communication system together with a plurality of base stations with which the mobile station performs site diversity communication, comprising:
a plurality of receiving units, wherein each of the receiving unit receives a signal transmitted from a different one of the base stations;
a plurality of demodulating units, wherein each of the demodulating units demodulates the signal received by a corresponding one of the receiving units to thereby generate a soft decision value;
a plurality of deinterleavers, wherein each of the deinterleavers deinterleaves the soft decision value generated by a corresponding one of the demodulating units to thereby obtain a deinterleaved result;
a combining unit that adaptively code-combines the deinterleaved results of all the deinterleavers to thereby obtain a combined result; and
a decoding unit that subjects the combined results to error-correction decoding processing.

15. The mobile station according to claim 14, wherein
the demodulating units demodulates the signal received by the corresponding one of the receiving units based on the control information included in the signal.

16. The mobile station according to claim 14, transmits the reception signal quality information, to the base stations, that includes one of a signal-to-interference ratio and a delay spread.

17. A method for performing site diversity communication between a plurality of base stations and at least one mobile station,
wherein the method in the base stations comprises the steps of:
receiving reception signal quality information indicating a quality of a communications path between the base station and a mobile station;
setting a condition for signal processing based on the reception signal quality information, wherein the condition includes at least one of a modulation method, an interleave length, a coding ratio, and a puncturing rule;
processing a signal based on the setting; and
transmitting the processed signal to the mobile station;
and wherein the method in the mobile station comprises the steps of:
receiving a signal at each of a plurality of receiving units wherein each signal is transmitted from a different base station;
demodulating the signal received by a corresponding one of the receiving units to generate soft decision values;

deinterleaving each soft decision value to produce deinterleaved results;

adaptively code-combining the deinterleaved results; and performing error-correction decoding processing on the combined deinterleaved results.

18. The method according to claim 17 in the base section side, further comprising appending a control information to the processed signal, wherein the control information includes information regarding the set condition.

19. The method according to claim 17 in the base section side, further comprising:

determining the quality of the communication path between the base station and the mobile station from the reception signal quality information; and setting a modulation method as the condition, with a number of levels that are appropriate to the determined reception quality.

20. The method according to claim 19 in the base section side, further comprising setting a multi-level modulation method as the condition which enables an increase in the number of bits in one symbol to be transmitted.

21. The method according to claim 19 in the base section side, further comprising:

determining the number of levels of the modulation method set in other base stations; and increasing a number of bits to be punctured based when it is determined whether the modulation method set in other base stations has higher levels.

22. The method according to claim 17 in the base section side, further comprising transmitting information bits as they are and puncturing parity bits when the condition includes the puncturing rule and when a turbo code is applied to the puncturing rule.

23. The method according to claim 17 in the base section side, further comprising deleting information bits and puncturing parity bits at base stations other than the base station when the condition includes the puncturing and when a turbo code is applied to the puncturing rule.

24. The method according to claim 17 in the mobile station side, further comprising demodulating the signal received by the corresponding one of the receiving units based on the control information included in the signal.

25. The method according to claim 17 in the mobile station side, further comprising transmitting the reception signal quality information, to the base stations, that includes one of a signal-to-interface ratio and a delay spread.

* * * * *